United States Patent
Kear et al.

(10) Patent No.: US 7,407,604 B2
(45) Date of Patent: Aug. 5, 2008

(54) NANOSTRUCTURED RE-DOPED $SiO_2$-BASE FLUORESCENT MATERIALS AND METHODS FOR PRODUCTION OF SAME

(75) Inventors: Bernard H. Kear, Whitehouse Station, NJ (US); Christopher D. Haines, Monmouth Junction, NJ (US); George H. Sigel, Stockton, NJ (US); Lisa C. Klein, Metuchen, NJ (US); Varadh Ranganathan, New Brunswick, NJ (US)

(73) Assignee: Rutgers The State University of New Jersey, New Brunswick, NJ (US)

( * ) Notice: Subject to any disclaimer, the term of this patent is extended or adjusted under 35 U.S.C. 154(b) by 325 days.

(21) Appl. No.: 11/029,556

(22) Filed: Jan. 5, 2005

(65) Prior Publication Data

US 2005/0152824 A1 Jul. 14, 2005

Related U.S. Application Data

(60) Provisional application No. 60/535,138, filed on Jan. 8, 2004.

(51) Int. Cl.
*C09K 11/02* (2006.01)
*C09K 11/59* (2006.01)
*C09K 11/64* (2006.01)
*C09K 11/79* (2006.01)

(52) U.S. Cl. ............ 252/301.4 F; 501/32; 501/12; 501/54; 501/133; 977/778; 977/811; 977/834; 65/17.6; 65/33.1

(58) Field of Classification Search ........... 252/301.4 F, 252/301.6 F; 501/32, 12, 54, 133; 977/778, 977/811, 834; 65/17.6, 33.1
See application file for complete search history.

(56) References Cited

U.S. PATENT DOCUMENTS 7,122,129 B2 * 10/2006 Yagi et al. ............. 252/301.4 F

OTHER PUBLICATIONS

Cannas, Carla, Casu, Mariano, Musinu, Anna, Piccaluga, Giorgio, Speghini, Adolfo, and Bettinelli, Marco, "Synthesis, Characterization and Optical Spectroscopy of a $Y_2O_3$-$SiO_2$ Nanocomposite doped with $Eu^{3+}$," *Journal of Non-Crystalline Solids*, 306, pp. 193-199, Aug. 2002.

Kepiński, L., Wolcyrz, "Nanocrystalline Rare Earth Silicates: Structure and Properties," *Materials Chemistry and Physics*, 81, pp. 396-400, Aug. 28, 2003.

(Continued)

*Primary Examiner*—C. Melissa Koslow
(74) *Attorney, Agent, or Firm*—Watov & Kipnes, P.C.; Kenneth Watov

(57) ABSTRACT

A new class of nanostructured RE-doped $SiO_2$-base materials that display superior fluorescence properties is provided. In particular, high gain combined with a broad and flat spectral band width is observed in material composed of a high fraction of a nano-dispersed metastable silicate phase in a glassy $SiO_2$ matrix, produced by partial devitrification (crystallization) of several glassy $Al_2O_3$/$Er_2O_3$- and $Y_2O_3$/$Er_2O_3$-doped $SiO_2$ compositions. Also, a highly deconvoluted spectral emission, with several prominent peaks, is observed in completely devitrified material, consisting of a uniform nano-dispersion of an equilibrium silicate phase in a crystobalite $SiO_2$ matrix. Such enhanced fluorescence properties were observed in heat treated nanopowders prepared by vapor-phase, solgel, rapid solidification, and spray-pyrolysis methods.

21 Claims, 9 Drawing Sheets

Pyrochlore structure:
$(Er/Y)_2 Si_2O_7$

OTHER PUBLICATIONS

Anh, T. Kim, Minh L. Quoc, Vu, N., Huong, T. Thu, Huong, N. Thanh, Barthou, C. and Strek, W. "Nanomaterials Containing Rare-Earth Ions Tb, Eu, Er and Yb: Preparation, Optical Properties and Application Potential," *Journal of Luminescence*, 102-103, pp. 391-394, May 2003.

Haines, Christopher D., Ranganathan, Varadh, Halpern, Susan B., Kear, Bernard H., Klein, Lisa C., Sigel, Jr., George H., and Yao, Nan, "Broad, Flat Fluorescence Emissions from Nanostructured Rare-Earth Dope Silicates," *Proceedings of SPIE*, 5450, pp. 431-438, Sep. 2004, Strasbourg, France.

* cited by examiner

Pyrochlore structure:
(Er/Y)$_2$ Si$_2$O$_7$

NANOSTRUCTURED RE-DOPED SIO₂-BASE FLUORESCENT MATERIALS AND METHODS FOR PRODUCTION OF SAME

RELATED APPLICATION

The present Application claims the benefit of U.S. Provisional Application No. 60/535,138, filed Jan. 8, 2004, and entitled "Nanostructured Re-Doped $SiO_2$-Base Fluorescent Materials And Methods For Production Of Same."

FIELD OF THE INVENTION

The present invention relates generally to rare-earth (RE)-doped optical materials, and more particularly to nanostructured RE-doped optically active materials.

BACKGROUND OF THE INVENTION

Rare-earth doped optical materials have been studied extensively over the past 40 years. The unique electronic structure of the lanthanides, comprised of partially filled 4f orbitals, lends itself well to photonics. The energies associated with these intra 4f electron transitions are located in the ultraviolet (UV), visible (VIS), and infrared (IR). Researchers have therefore employed these materials in the production and manipulation of light at these wavelengths. A significant portion of the research in this area has focused on the trivalent erbium ion. This is largely due to the $^4I_{15/2} \rightarrow {}^4I_{13/2}$ transition of $Er^{3+}$ at 1.5 μm which coincides with the minimum loss wavelength of silica optical fibers. One of the most important innovations to emerge from this work is the Erbium-doped fiber amplifier (EDFA) which has revolutionized telecommunications. The ability to optically amplify signals in an integrated fiber amplifier has led to the realization of long-haul optical fiber networks.

Recently, research has been directed toward increasing the bandwidth in optical fibers, which entails increasing the spectral width of the erbium emission (see Table 1 shown below). Wavelength division multiplexing (WDM) allows many signals to be sent down an optical fiber at once, each comprising its own channel. In addition, there has been a great deal of work in "flattening" the fluorescence emission to obtain equal gain across a broad range of wavelengths, thus increasing the number of channels. Conventional research has examined tailoring the composition to promote broader and flatter emissions. Some of the most promising results were obtained with alumino-silicate glasses, but a material with a true flat emission has yet to be uncovered. The integration of nanotechnology and photonic materials, often dubbed nanophotonics, offers a route to develop such a material. The quantum confinement effects associated with small nanoparticles adds a new method for achieving novel optical properties by introducing the concept of tunability. Recent studies have shown size effects on the optical properties of various materials which opens the door for tunable photonic materials. By manipulating the nanostructure of the material, its fluorescence emission characteristics can be modified.

TABLE 1

Optical parameters of $Er^{3+}$ in a range of host materials

| | Peak absorption cross-section (488 nm) | Peak absorption cross-section (980 nm) | $^4I_{13/2} \rightarrow {}^4I_{15/2}$ PL lifetime[a] | Upconversion coefficient | Peak-stimulated emission cross-section (1535 nm) | Luminescence bandwidth (1535 nm) FWHM at 300 K | Maximum optically active concentration |
|---|---|---|---|---|---|---|---|
| Silica | $<8.0 \times 10^{-21}$ cm² | $1.0 \times 10^{-21}$ cm² | $12 \times 10^{-3}$ s | $3.0 \times 10^{-21}$ cm² | $7.27 \times 10^{-21}$ cm² | 11 nm | 0.1 at % (melt glass) (PECVD) |
| Phospho-silicate glass | | $2.01 \times 10^{-21}$ cm² | $10 \times 10^{-3}$ s | $9.0 \times 10^{-21}$ cm³ s⁻¹ | | 27 nm | 2.5 at % |
| Alumino-silicate glass | | $3.12 \times 10^{-21}$ cm² | $10 \times 10^{-3}$ s | $1.0 \times 10^{-16}$ cm³ s⁻¹ | $5.7 \times 10^{-21}$ cm² | 43 nm | 500 ppm |
| Silicon (crystalline) | $2-8 \times 10^{-12}$ cm² (514 nm) | | $420 \times 10^{-6}$ s | | | | $3 \times 10^{17}$ cm⁻³ |
| Amorphous silicon | $1.4 \times 10^{-14}$ cm² (514 nm) | | $800 \times 10^{-6}$ s | | | | |
| Silicon-rich silica | $7.3 \times 10^{-17}$ cm² | | ~$2.5 \times 10^{-3}$ s (depends on Si content) | | | Up to 60 nm (depends on Si content) | |
| Porous silicon | | | $1 \times 10^{-3}$ s | | | ~10 nm | |
| Alumina | | $2.0 \times 10^{-21}$ cm⁻² | $7.8 \times 10^{-3}$ s | $4.0 \times 10^{-18}$ cm³ s⁻¹ | $6.0 \times 10^{-21}$ cm² | 55 nm | |
| GaN | | $4.8 \times 10^{-21}$ cm⁻² | $2.95 \times 10^{-3}$ s | | | ~8 nm | |
| GaAs | | | $1 \times 10^{-3}$ s | | $1 \times 10^{-3}$ cm² | | $7 \times 10^{17}$ cm⁻³ |
| ZBLAN | | | | | $5.0 \times 10^{-21}$ cm² | | 18 mol % |
| Lithium niobate | | | $3.0 \times 10^{-3}$ s | $<1.4 \times 10^{-19}$ cm³ s⁻¹ | | | |
| YAG | | | | $5.4 \times 10^{-17}$ cm³ s⁻¹ | | | |
| PPMA | $1.1 \times 10^{-20}$ cm² | | $0.8 \times 10^{-6}$ s | | | 70 nm | |
| Tellurite | | $4.48 \times 10^{-21}$ cm⁻² | $3.3 \times 10^{-3}$ s | $2.74 \times 10^{-17}$ cm³ s⁻¹ | $1.3 \times 10^{-20}$ cm⁻² | 80 nm | 2.5 at % |

[a]Maximum value reported in unclustered material.

SUMMARY OF THE INVENTION

A general object of the invention is to utilize available nanopowder synthesis and preform fabrication methods to obtain glassy $SiO_2$-base materials, which contain high concentrations of RE and other oxide phases in supersaturated solid solution states.

It is another and critical object of the invention to utilize heat treatments to induce controlled decomposition of such super saturated glassy $SiO_2$-base materials in high fractions of a nano-dispersed metastable or equilibrium nanophase in a $SiO_2$ matrix. The metastable nanocomposite yields a high gain spectral emission, with a single broad and flat peak, whereas the equilibrium nanocomposite yields a high gain deconvoluted spectral emission, with several prominent peaks.

It is yet another object of the invention to achieve superior fluorescence properties in the $SiO_2$-base nanocomposites by adjusting composition, metastability, and nanostructure, and to utilize such materials for fiber optic, planar waveguide, and laser applications.

A new class of nanostructured RE-doped $SiO_2$-base materials that display superior fluorescence properties and performance has been discovered. The new materials are attractive candidates for next generation fiber optic, planar waveguide and laser applications. Controlled thermal decomposition of an amorphous or glassy $SiO_2$-base precursor phase that contains a high concentration of RE and other oxide phases in supersaturated solid solution is the key to the formation of the preferred nanostructures. Typically, the nanostructured product comprises a uniform nanoscale dispersion of a fluorescent RE-containing silicate phase in a $SiO_2$ matrix phase. To mitigate concentration quenching, and hence to achieve high gain, the nano-dispersed phase is co-doped with $Al_2O_3/Er_2O_3$ or $Y_2O_3/Er_2O_3$.

Starting materials in the form of discrete nanoparticles or preforms of nanoparticles can be produced by various chemical and physical synthesis methods. We have focused on vapor-phase, solgel and spray-pyrolysis methods, since they yield materials that are homogeneous at the molecular level, thus enabling uniform nano-ceramic composites to be developed by heat treatment. Thus, when heat treatment at ~1000° C. for 24 hours is used to induce partial devitrification (crystallization) of the initial glassy $Al_2O_3/Er_2O_3$-doped $SiO_2$ material, the effect is to generate a uniform nano-dispersion of a metastable monoclinic phase $(SiO_2.(Al,Er)_2O_3)$ in a glassy $SiO_2$-rich matrix. This material displays high gain combined with a broad and flat spectral bandwidth, making it an attractive candidate for optical amplifiers. On the other hand, when heat treatment at ~1400° C. for 24 hours is used to induce complete devitrification of this same glassy material, the effect is to generate a uniform nano-dispersion of a stable pyrochlore phase $(2SiO_2.(Al,Er)_2O_3)$ in a crystobalite $SiO_2$ matrix. This material displays a deconvoluted spectral emission, with several prominent peaks, which suggests applications for tunable lasers. Similarly, for the case of the $Y_2O_3/Er_2O_3$-doped $SiO_2$, except that the gain is appreciably higher, perhaps reflecting differences in site occupancies of $Y^{3+}$ and $Al^{3+}$ ions in the crystal lattices.

In addition to optical amplifiers and tunable lasers, other potential applications for nano-photonic ceramics include 3-color displays, sensors, optical switches and modulators, splitters and couplers, isolators, and filters.

BRIEF DESCRIPTION OF THE DRAWINGS

Various embodiments of the present invention are described in detail below with reference to the drawings, in which like items are identified by the same reference designation, wherein.

DETAILED DESCRIPTION OF THE INVENTION

Figure 1A:
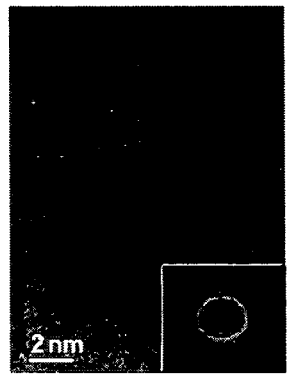
FIGS. 1A, 1B, and 1C are high resolution TEM micrographs showing stages in the devitrification of the SAE glassy material after annealing at 800° C., 1000° C., and 1400° C., respectively, illustrating that after annealing at 1000° C., the structure consists of a nanoscales dispersion of a metastable intermediate phase $[SiO_2.(Al,Er)_2O_3)]$ in a glassy $SiO_2$ matrix, whereas after annealing at 1400° C., the structure consists of a nanoscale dispersion of an equilibrium phase $[2SiO_2.(Al,Er)_2O_3)]$ in a crystobalite $SiO_2$ matrix.

The present invention, as described in greater detail below, provides optically-active nanostructured materials that exhibit unprecedented spectrally flat and broad fluorescence emissions. We ascribe the exceptional optical properties of the material to the two phase (nanocrystals in an amorphous matrix) nanostructure, which resembles that of a glass-ceramic material. However, it is important to make a distinction between these materials and glass-ceramics which typically utilize nucleating agents to promote the nucleation of a second phase out of an amorphous precursor phase. The high surface area of our nano-ceramic powder provides an abundance of favorable nucleation sites for the precipitating phase, while accommodating the negative free volume change associated with the amorphous to crystalline phase transition. This gives us the ability to synthesize nanocomposite materials by exploiting the surface characteristics of nanoparticles.

This invention, in its various embodiments as described below, relates generally to the field of far-from-equilibrium processing of nanostructured ceramics, utilizing known chemical and physical methods. However, as previously indicated, an important distinction from the prior art is the use of these methods for processing glassy $SiO_2$-base nanopowders or preforms that contain high concentrations of RE and other oxide phases in supersaturated solid solution states. It is the controlled thermal decomposition of such supersaturated glassy phases to generate novel nanocomposite structures that clearly differentiates the present invention from the prior art. Evidence for the novelty of such $SiO_2$-base nanocomposites is provided by the unprecedented fluorescence emissions displayed by the materials.

The specifics of the processing routes devised for making nanostructured powders, films, coatings or monoliths also have some novel features. In particular, in one embodiment, we note that the incorporation of a heat treatment as an additional step in vapor-phase, solgel and spray-pyrolysis powder processing methods, as well as in bulk glass processing methods, such as glass-ceramic processing. An important advantage of this modified fabrication route is the flexibility afforded in control of the final nanostructure, which enables fluorescence properties to be tailored to the performance requirements of various applications.

Compositions and Nanostructures

The following $SiO_2$-base compositions (in mol. %) were investigated: $80SiO_2$-$18Al_2O_3$-$2Er_2O_3$ (hereafter SAE composition) and $90SiO_2$-$8Y_2O_3$-$2Er_2O_3$ (hereafter SYE composition). Nanopowders of the SAE and SYE compositions were prepared by vapor-condensation and solgel methods, respectively. In both cases, synthesis parameters were adjusted to produce amorphous or glassy $SiO_2$-base nanopowders, in which the co-doped $Er^{3+}/Al^{3+}$ and $Er^{3+}/Y^{3+}$ ions were in highly supersaturated states. To mitigate undesirable concentration quenching, it is preferred that the $Al_2O_3$:$Er_2O_3$ or $Y_2O_3$:$Er_2O_3$ ratio in either the metastable silicate phase or the equilibrium silicate phase is at least 1:1.

Figure 1B:
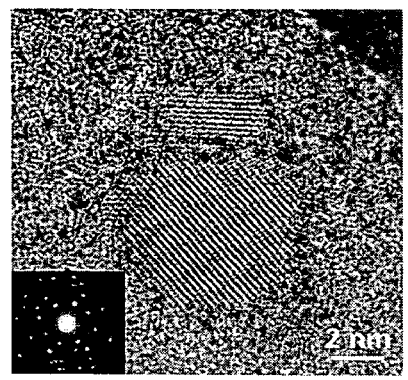
Figure 1C:
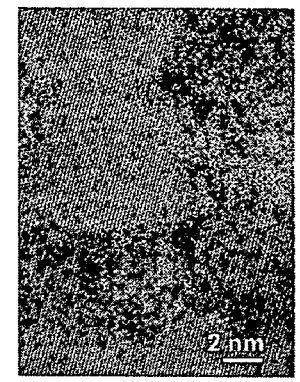
Figure 2:
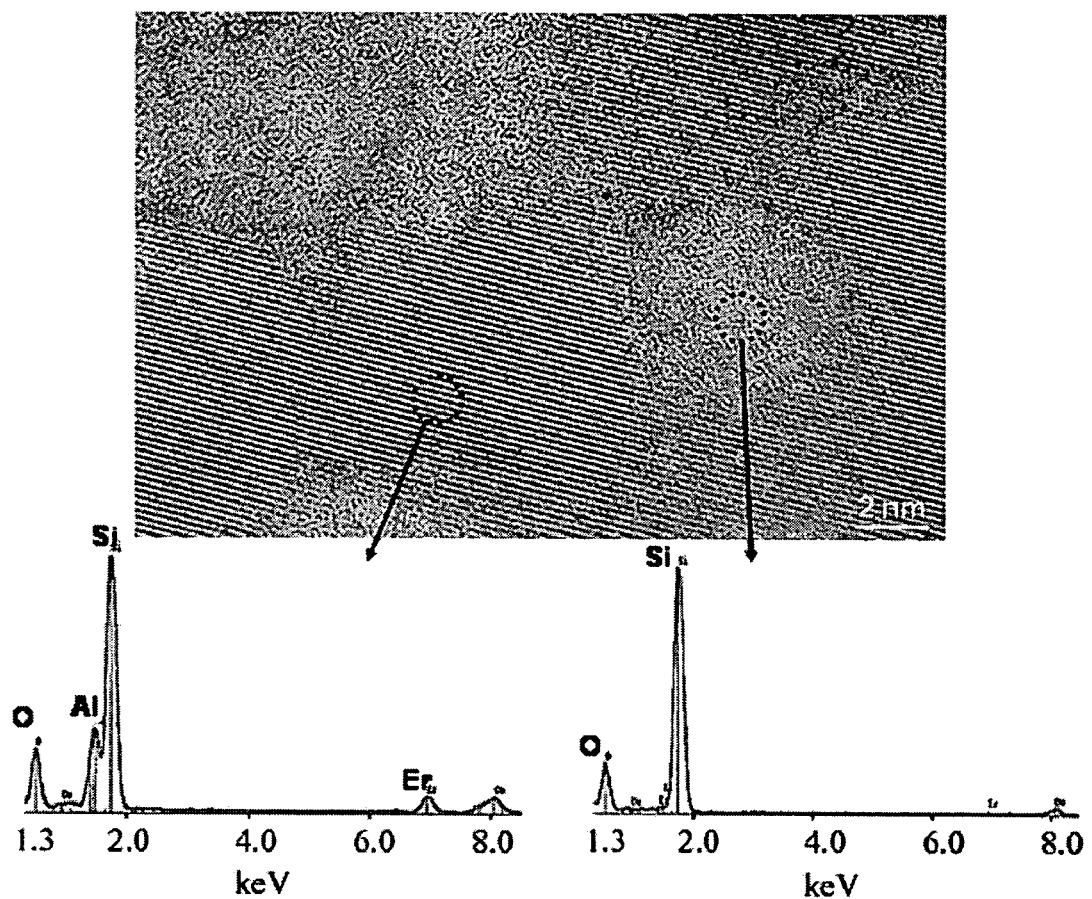
FIG. 2 illustrates TEM nanoprobe results showing evidence for segregation of Al/Er to the nano-dispersed equilibrium in a crystobalite matrix, after heat treatment at 1400° C. metastable phase in a glassy $SiO_2$ matrix.

Using these glassy nanoparticles as starting materials, systematic heat treatments were used to investigate the devitrification (crystallization) process. High resolution transmission electron microscope (TEM) observations, performed on heat-treated SAE samples, showed that devitrification was initiated at ~1000° C. and was complete at 1400° C. (see FIGS. 1A, 1B, and 1C). The partially-devitrified material consisted of a uniform nanoscale dispersion of a metastable intermediate $SiO_2$.$(Al,Er)_2O_3$ phase in a glassy $SiO_2$-rich matrix. The corresponding equilibrium structure, observed in the fully-devitrified material, consisted of a nanoscale dispersion of $2SiO_2$.$(Al,Er)_2O_3$ phase (pyrochlore structure) in a nanocrystalline $SiO_2$ matrix (crystobalite structure). Evidence for segregation of Al/Er during phase decomposition of SAE material at 1400° C. is presented in FIG. 2. A similar behavior has been observed in heat-treated SYE samples. As further shown in FIGS. 1A, 1B, 1C and 2, it is clearly apparent that the grain size of the doped fluorescent silicates is less than 100 nm, and more specifically in the range of from about 1 to 20 nm.

Nanostructured Powders And Preforms

Figure 3:
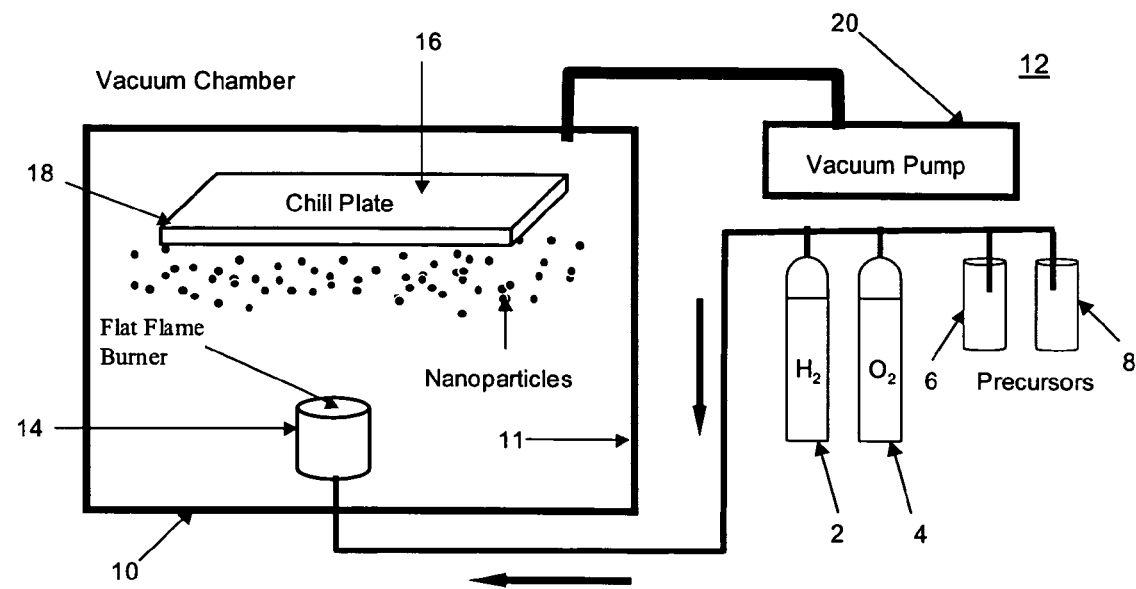
FIG. 3 is a block schematic diagram showing a chemical vapor condensation (CVC) process, including a flat-flame burner and adjacent chill plate.

SAE nanopowder synthesis—Oxide-ceramic nanopowders are routinely produced by flame pyrolysis methods, using a wide variety of precursor feeds. FIG. 3 shows a schematic of a flat-flame reactor 12 of advanced design, which yields loosely agglomerated nanoparticles 18 with a narrow particle size distribution. Note that FIG. 3 shows a hydrogen ($H_2$) supply source 2, an oxygen ($O_2$) supply source 4, and one or more precursor sources 6 and 8, respectively, each in supply communication with a vacuum chamber 10 forming part of the flat-flame reactor 12. The vacuum chamber 10 of the flat-flame reactor 12 houses a flat-flame burner 14 in proximity to a chill plate 16 for generating the nanoparticles 18. The vacuum chamber 10 is maintained in a vacuum state by a vacuum generator 20. In a typical procedure, mixed metalorganic precursors are fed into the burner 14, along with the combustible gases ($H_2$,$O_2$), supplied by the sources 2, 4, 6, and 8, respectively, and then experience complete decomposition in passing through the flame. When the hot gas stream, now containing the products of mixed-precursor decomposition, is directed onto the water-cooled copper chill plate 16, the effect is to cause prolific nucleation of nanoparticles 18, which are swept away in the gas stream to deposit on the walls 11 of the vacuum chamber 10. The nanoparticles are produced by rapid condensation from a supersaturated vapor state, and hence have metastable structure. On the other hand, when the products of precursor decomposition are directed onto a moderately heated substrate in situ sinter of the nanoparticles occur as fast as they arrive at the substrate surface, thus forming a porous or dense nanostructure deposit or preform.

An amorphous nanopowder of the SAE composition was prepared by this method, using precursors of the following compositions: Al-secbutoxide, tetraethyl-orthosilicate and Er-tetramethyl-heptadionate. The resulting nanoparticles had an average particle size of ~30 nm and were loosely agglomerated.

SYE nanopowder synthesis—High surface area $SiO_2$-base materials are routinely synthesized by the solgel method. The following procedure using this method was adopted for synthesizing the SYE composition: (1) a starting solution was obtained by dissolving tetraethyl-orthosilicate in ethyl alcohol, (2) a separate acidic solution (pH~2) of yttrium nitrate and erbium acetate was added to the starting solution, (3) the solution mixture was refluxed at room temperature, and set aside in sealed polypropylene tubes to effect gelation, and (4) after thorough drying, the gelled material was crushed to form fine particles of the desired SYE composition, albeit with nanoporous structures.

This same procedure may be used to prepare thin films on flat substrates, using dipping or spinning techniques. In addition, gels can be densified through heat treatment to form a clear transparent glass. This should enable the fabrication of nanostructured lasers, which could provide an alternative to melt-grown single-crystal lasers.

Nanopowder Compaction and Sintering

Nanopowder compacts or pellets of both SAE and SYE compositions were produced by cold pressing at 70 MPa. It was noted that the as-pressed pellets were transparent, despite the relatively low packing density (about 70%). The effect can be attributed to the presence in the nanopowder compacts of ultra fine or nano-scale pores only, which are too small to scatter visible light.

Figure 4:
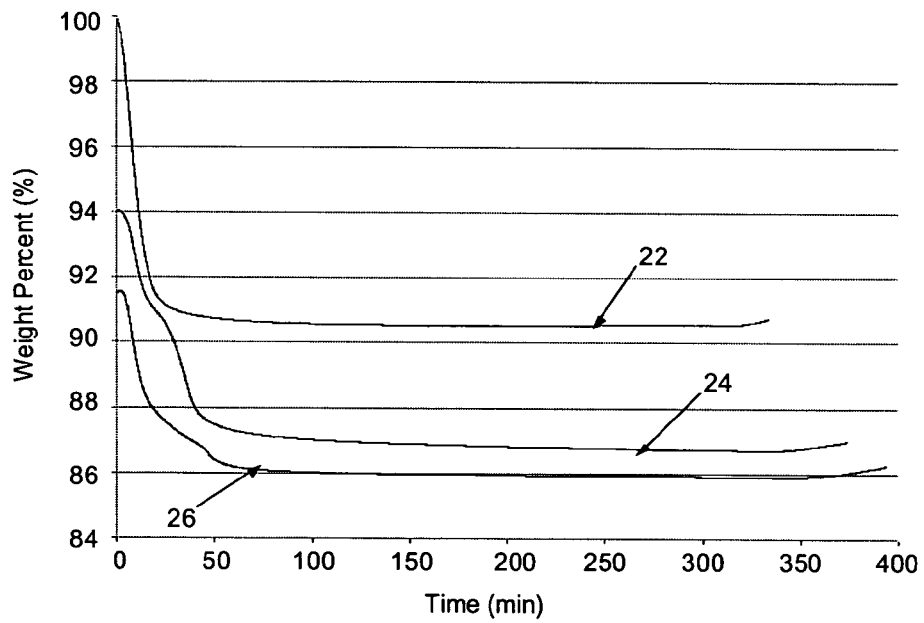
FIG. 4 shows TGA data for as-synthesized SYE material at three temperatures, whereby the heating rate up to the selected temperature was 10° C./minute.

TGA (thermogravimetric analysis) data obtained for solgel synthesized SYE material underscored the importance of a low temperature heat treatment to eliminate impurities left over from the decomposition of the precursor materials. As shown in FIG. 4, samples of solgel-synthesized SYE material where heat treated at 200, 400, and 500° C., respectively, in dry air as represented by curves 22, 24, and 26, respectively. The corresponding drop in weight of the samples over time under heat treatment indicates the removal of most of the residual impurities from the high surface area nanopowder. Based on these findings, all the powders were heat treated at 400° C. for 24 hours in dry air, prior to compaction to form pellet-like samples for fluorescence measurements.

The degassed and cold-pressed pellets were heat treated at temperatures up to a maximum of 1400° C. It was observed that complete densification of the amorphous nanopowder compacts occurred at temperatures as low as 1000° C., apparently due to the strong driving force for sintering provided by the exceptionally high surface area of the nanoparticles. Another factor promoting sintering is the phase decomposition that occurs at this temperature, FIG. 1. The evidence indicates that densification and phase decomposition occur concurrently, with the nanoparticle surfaces providing many favorable sites for nucleation and growth of the metastable intermediate phase. Thus, during sintering, the metastable nanophase particles become entrapped within the glassy $SiO_2$ matrix phase.

After sintering at 1000° C., the SAE material, now comprising a nano-dispersed metastable phase in a glassy $SiO_2$ matrix, appeared to be both strong and relatively fracture resistant. This is believed to be due to the introduction of compressive stresses in the glassy $SiO_2$ matrix during cool-down from the sintering temperature, which should inhibit crack initiation. The introduction of high strain gradients at nanoparticle/matrix interfaces should also impede crack growth by an interface decohesion mechanism.

Fluorescence Measurements

Figure 5:
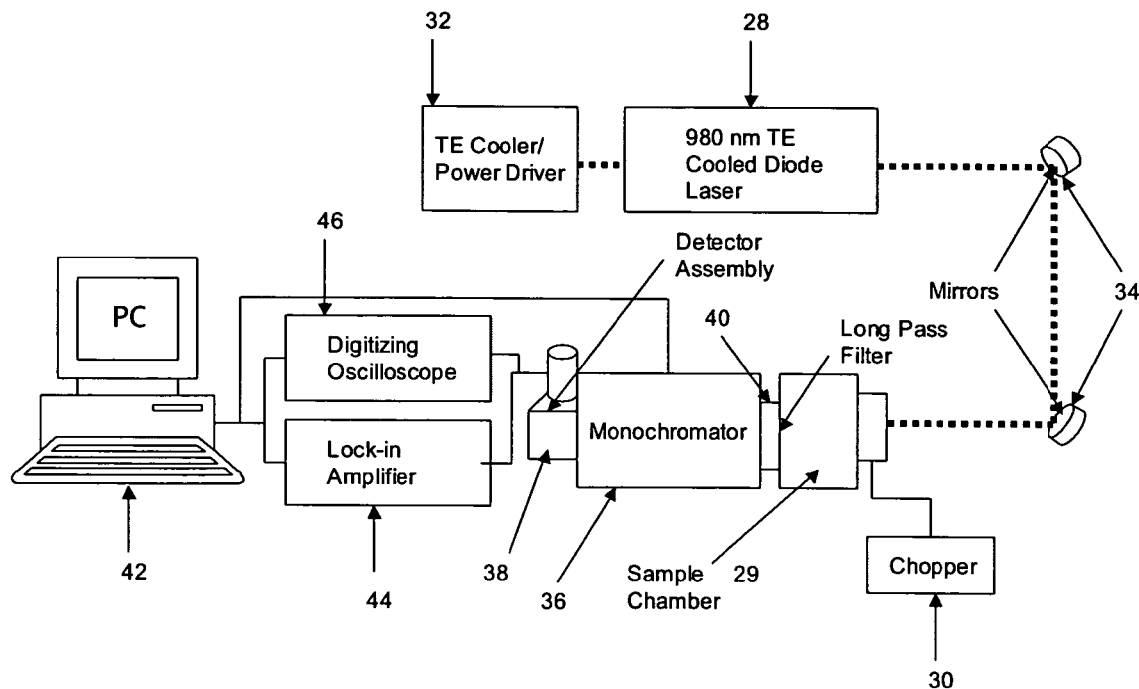
FIG. 5 shows a block schematic diagram of an experimental system for making fluorescence and lifetime measurements of materials produced by various embodiments of the invention.

FIG. 5 shows a schematic of an experimental system used to determine the fluorescence properties of the $Er^{3+}$-doped nanopowders. The system consists of a 980 nm laser pump diode 28, a thermoelectric cooler power driver 32, a sample chamber 29, a 200 Hz light chopper 30, a system of focusing optics 34 and monochromator 36, and a liquid $N_2$-cooled InGaAs detector 38. A 1200 nm long-pass filter 40 prevents stray pump light from entering the detector 38. A Labview interface program implemented by a computer 42 controls the monochromator 36 and a lock-in amplifier 44. The intensity of the 1.55 µm emission is measured directly using the InGaAs detector 38. The emission decay rate is determined by plotting intensity versus time, with the system operating in a pulsed mode (50 ms pulse duration at 1 Hz). The data are recorded on an oscilloscope 46 and plotted on a semilog scale to obtain the slope $1/t=\tau$, the lifetime decay constant.

Figure 6A:
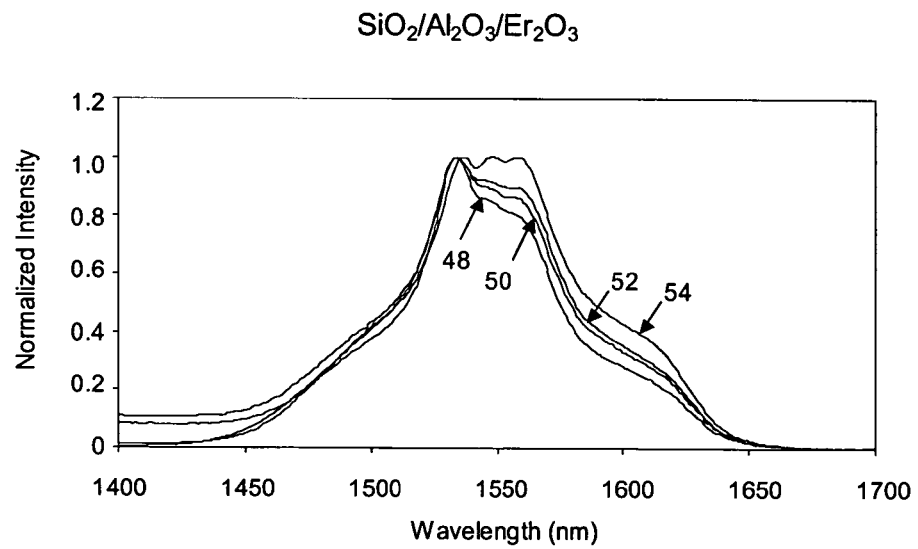
FIGS. 6A and 6B show a curve of the effects of heat treatments on the 1.55 μm $Er^{3+}$ fluorescence emission, and bar graphs showing relative intensity versus heat treatment temperature, respectively, from a sample of $80SiO_2/18Al_2O_3/2Er_2O_3$ (mol. %) (SAE) materials that was synthesized by CVC processing.
Figure 6B:
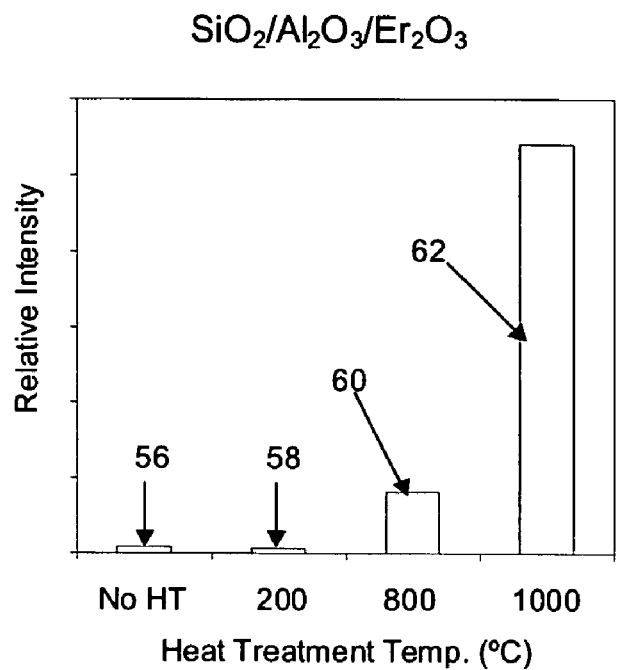
Figure 7A:
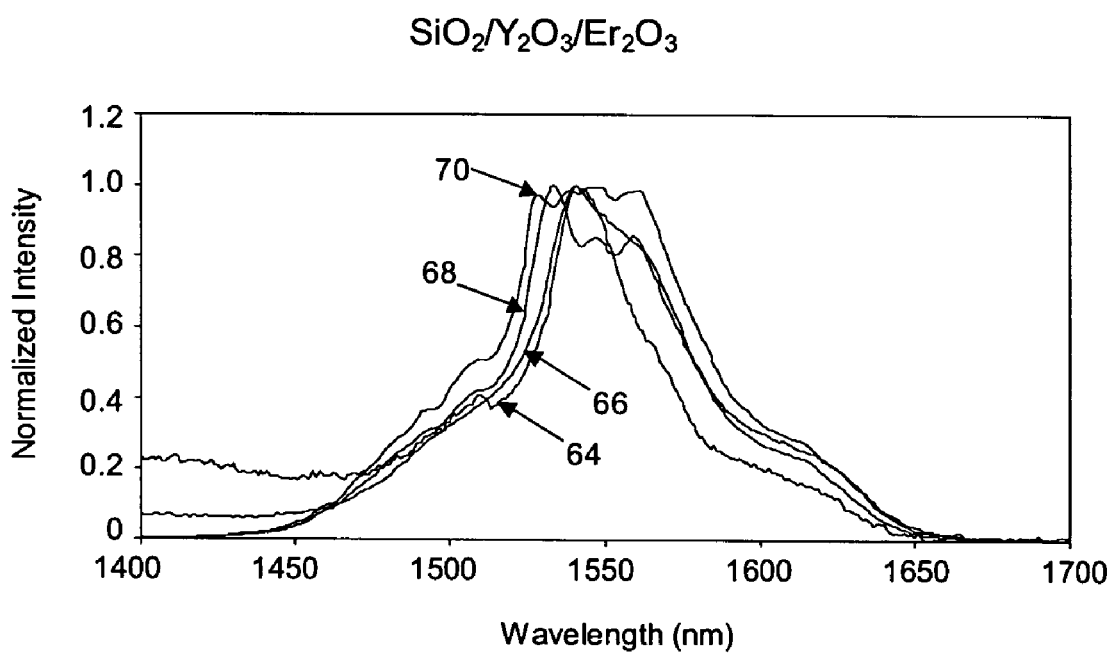
FIGS. 7A and 7B show the effects of heat treatment on 1.55 μm $Er^{3+}$ fluorescence emission, and bar graphs of relative intensity versus heat treatment temperature, respectively, from a sample of $90SiO_2/8Y_2O_3/2Er_2O_3$ (mol. %) (SYE) materials that was synthesized by the solgel process.
Figure 7B:
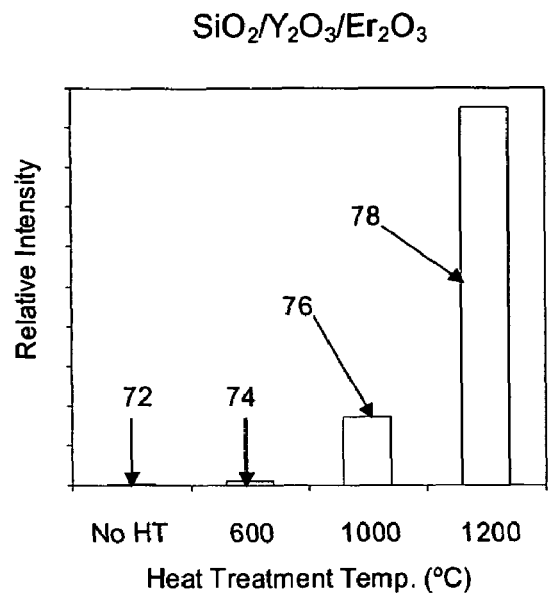

With increasing annealing temperature, both SAE and SYE test samples showed a dramatic increase in fluorescence emission intensity (see FIGS. 6 and 7). However, a surprising finding was the exceptionally strong emission at 1000° C. for the SAE material, and at 1200° C. for the SYE material (see FIGS. 6B and 7B, respectively). Note that in FIG. 6A graphical curves 48-54, respectively, are shown representing the emission spectra of SAE test samples after no heat treatment and after heat treatment at annealing temperatures of 200° C., 800° C., and 1000° C., respectively. As further shown in FIG. 6A. the graphical curves of the corresponding uniform nanoscale dispersions generally exhibit a high gain fluorescence emission, with a broad and flat peak centered at about 1.55 µm. Referring to FIG. 6B, the graph shows the relative intensities of SAE test samples 56 to 62, respectively, after no heat treatment, and after heat treatment at annealing temperatures of 200° C., 800° C., and 1000° C., respectively. Note also that in FIG. 7A, graphical curves 64 to 70 are shown representing the emission spectra of SYE test samples after no heat treatment, and after heat treatments at annealing temperatures of 600° C., 1000° C., and 1200° C., respectively. As further shown in FIG. 7A. the graphical curves of the corresponding uniform nanoscale dispersions generally exhibit a high gain fluorescence emission, with a broad and flat peak centered at about 1.55 µm. Referring to FIG. 7B, the graph shows the relative intensities of SYE test samples 72 to 78, respectively, after no heat treatment, and after heat treatment at annealing temperatures of 600° C., 1000° C., and 1200° C., respectively. Moreover, the width and flatness of the emission are exceptional. Interestingly, the peak in emission intensity of the SAE material correlates with an unique nanocomposite structure, consisting of a high fraction of metastable $SiO_2.(Al, Er)_2O_3$ nanoparticles in an amorphous or glassy $SiO_2$-rich matrix (see FIG. 1B).

Figure 8:
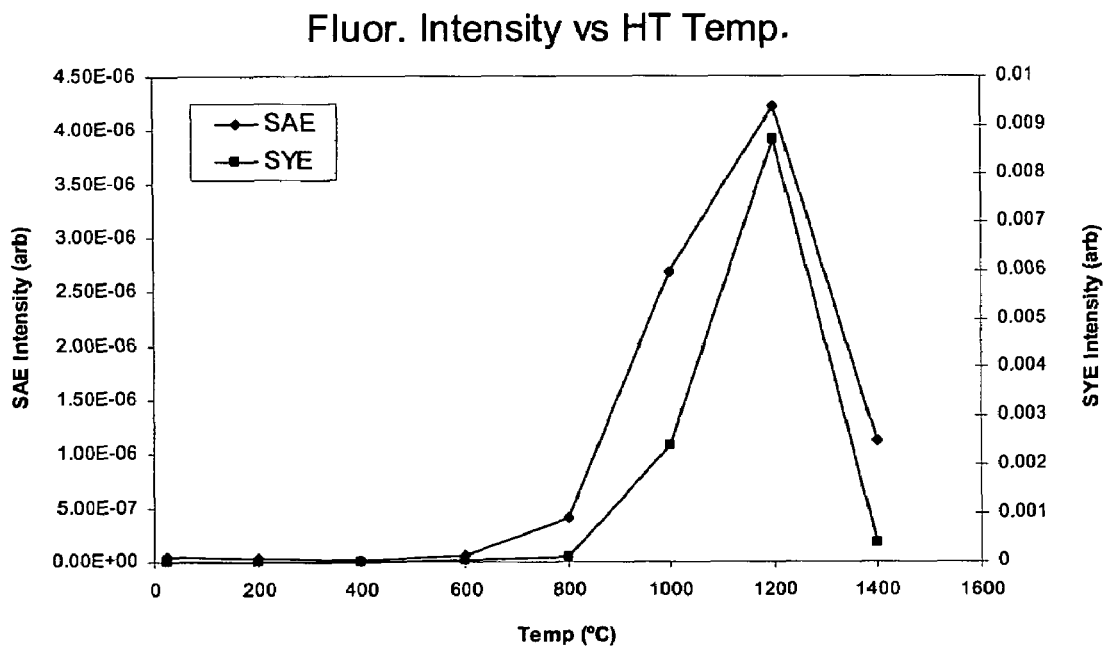
FIG. 8 shows curves for intensity versus temperature of fluorescent emissions for both SAE and SYE materials, respectively, whereby a maximum occurs at about 1200° C.

Also, as shown in FIG. 8, the relative intensities of the fluorescence emissions showed a maximum at ~1200° C. This is an important finding for amplifier applications, because it demonstrates that metastable nanostructured materials provide high gain, as well as a broad and flat spectral bandwidth.

By fixing all measurements, such as sample size, pump power, slit openings, etc, signal strengths for the 1.55 µm emission in the two materials can be compared. The solgel-derived SYE material exhibits a three to four-fold increase in emission intensity over the CVC-derived SAE material. This effect may be attributed to differences in site occupancies of $Al^{3+}$ and $Y^{3+}$ ions in the metastable intermediate phases.

Figure 9A:
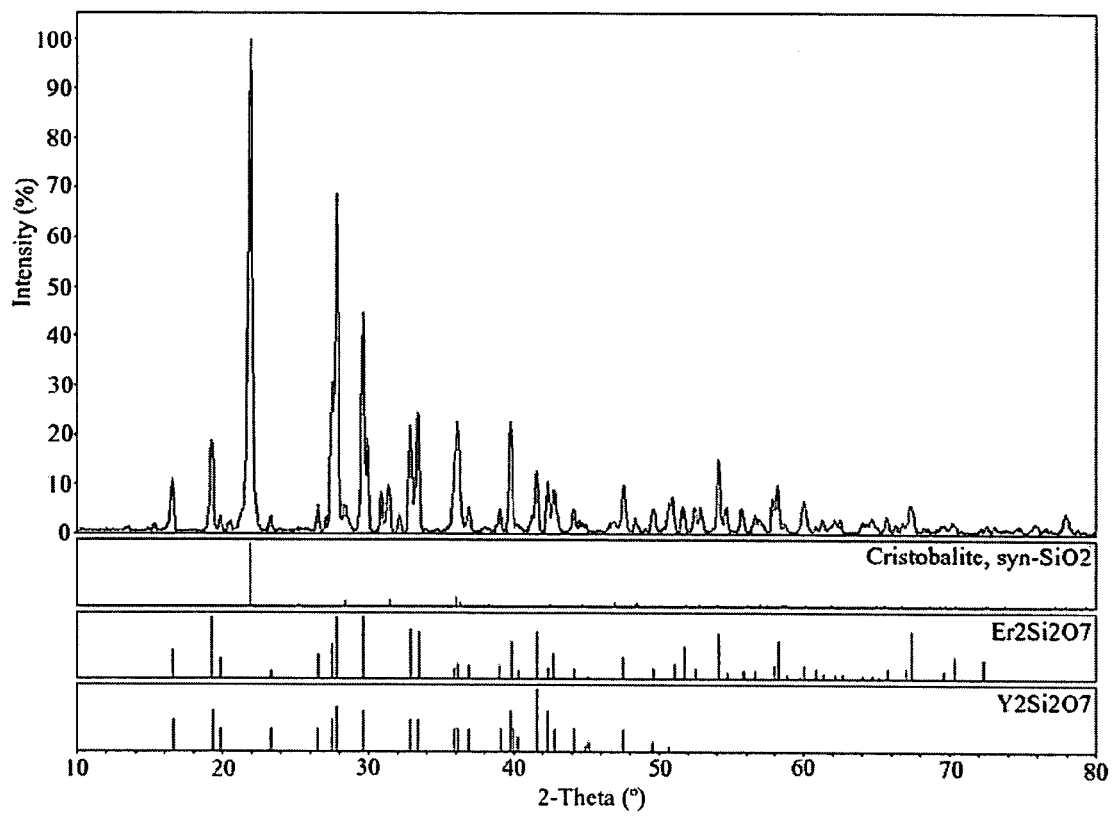
FIG. 9A shows an X-ray diffraction pattern of pyrochlore phase and SYE material after heat treatment at 1400° C.
Figure 9B:
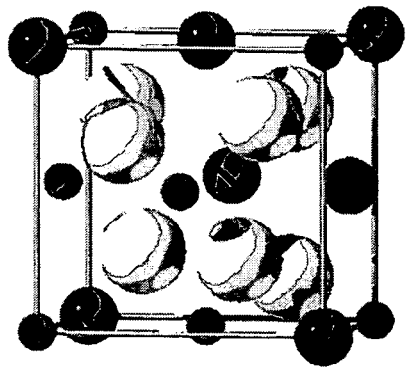
FIG. 9B shows a model of the pyrochlore structure for $(Er/Y)_2Si_2O_7$.
Figure 10:
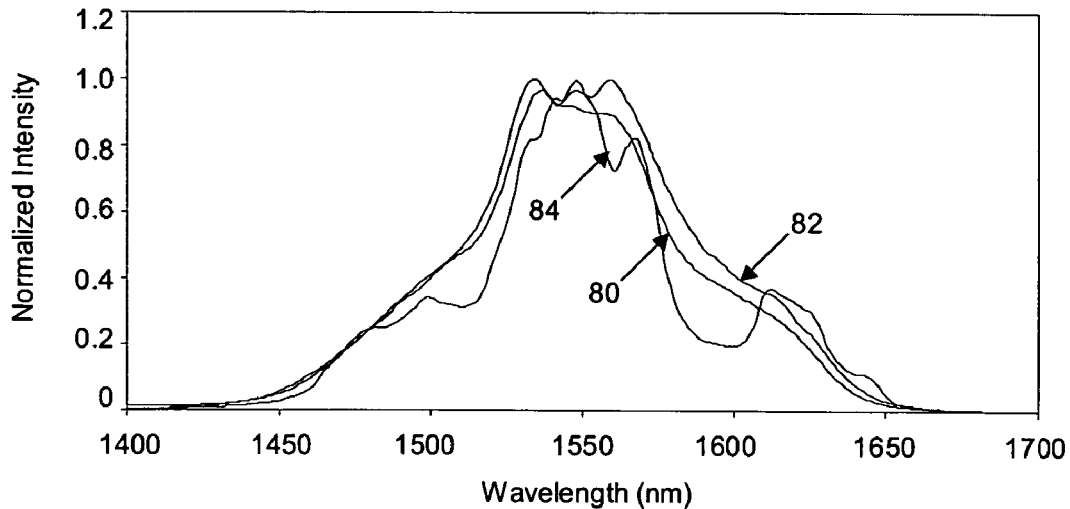
FIG. 10 shows curves for normalized intensity versus wavelength illustrating the effect of high temperature heat treatments on the 1.55 μm $Er^{3+}$ fluorescence emission in CVC-derived SAE material, illustrating deconvolution of the spectral emission at about 1400° C.

In order to observe the effect of complete devitrification of the co-doped materials, a few samples were heat treatment at 1400° C. for 24 hour. Both SAE and SYE samples showed evidence for the formation of an equilibrium two-phase structure, consisting of pyrochlore and crystobalite phases (see FIGS. 9A and 9B). Moreover, both samples showed a deconvoluted spectrum, with several relatively sharp peaks that may be interpreted as reflecting different site occupancies of the optically active $Er^{3+}$ relative to the $Al^{3+}$ and $Y^{3+}$ ions in the crystal lattices. An example of this effect for the SAE material is shown in FIG. 10. Note that in FIG. 10 graphical curves 80 to 84, respectively, showing emission spectra of test samples heat treated at annealing temperatures of 800° C., 1200° C., and 1400° C., respectively. As further shown in FIG. 10, the graph curves of the corresponding uniform nanoscale dispersions generally exhibit a high gain fluorescence emission, with several prominent peaks centered at about 1.55 µm.

An important parameter in fluorescent materials is the emission lifetime. The lifetime at a given level is inversely proportional to the probability (per unit time) of a transition to a lower level. The decay time of the radiative transition is strongly influenced by local interactions with the erbium ion. Shorter lifetimes are expected when the materials experience concentration quenching, due to ion-ion interactions. Impurities such as OH can also dampen lifetimes by promoting non-radiative transitions to the ground state. Measured lifetimes of heat-treated SAE powders are presented in Table 2. It is interesting to note that the longest lifetimes coincide with heat-treatments that yield optimal fluorescence intensity. For comparison, typical $Er^{3+}$ lifetimes in alumino-silicate glasses are approximately 6-10 ms.

TABLE 2

Lifetimes of 1.55 μm $Er^{3+}$ emission ($^4I_{13/2} \rightarrow {}^4I_{15/2}$) in CVC derived SAE powder

| Temperature (° C.) | Lifetime (ms) |
|---|---|
| 800 | 3.79 |
| 1000 | 5.08 |
| 1100 | 6.27 |
| 1200 | 6.32 |
| 1400 | 5.28 |

Performance And Applications

Figure 11:
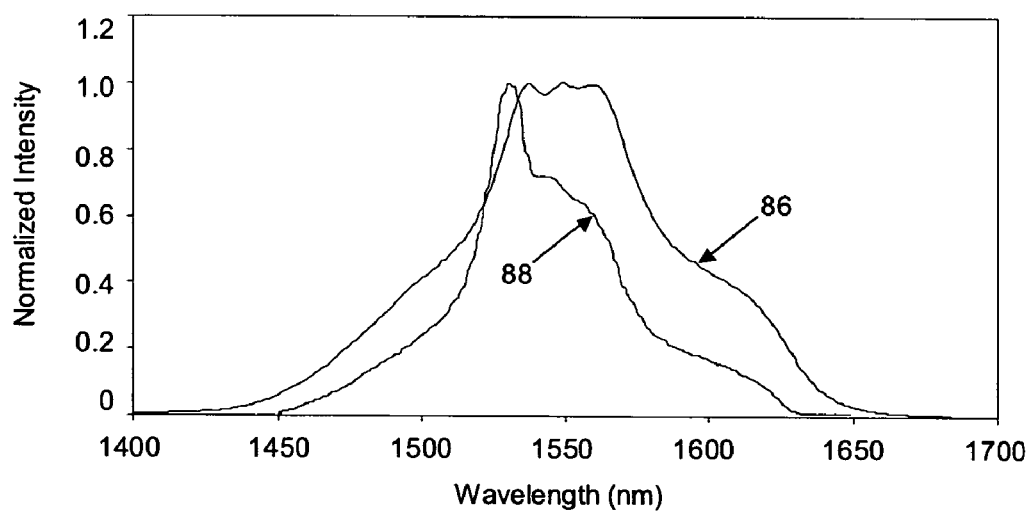
FIG. 11 shows curves for normalized intensity versus wavelength for comparing fluorescence spectra for CVC-derived SAE material after heat-treatment at 1000° C., and commercial Erbium doped fiber amplifier (EDFA) material.
Figure 12:
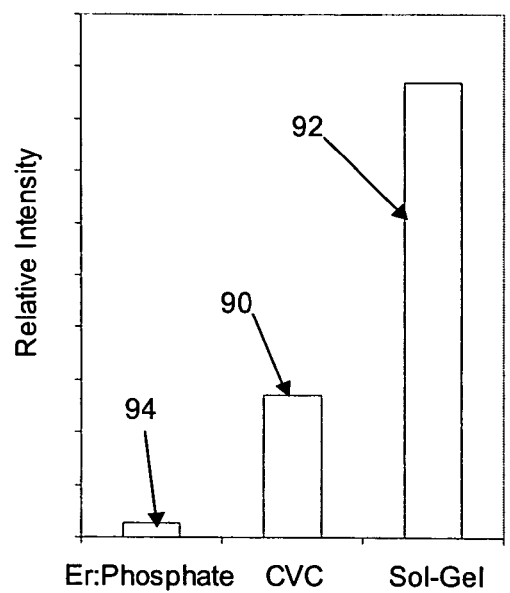
FIG. 12 shows a bar graph for comparing the relative intensities of CVC (SAE) and solgel (SYE) derived materials compared with that of an Er-phosphate glass.

The present invention demonstrates that metastable $SiO_2$-base ceramics that are co-doped with $Al_2O_3/Er_2O_3$ and $Y_2O_3/Er_2O_3$ have potential use as optical amplifier materials. The question that needs to be addressed now is how the fluorescence data obtained for the metastable nano-ceramics compares to that of conventional ceramics. FIG. 11 is a graph comparing the emission spectra 86 and 88, respectively, for CVC-derived material (SAE, heat treated at 1000° C.) with that of conventionally processed material, respectively. Note that "EDFA" of FIG. 11 is an acronym for "Erbium doped fiber amplifier." As shown, the CVC nano-ceramic displays a much broader and flatter gain spectrum centered at about 1.55 μm. Moreover, FIG. 12 shows that the emission intensity 90 and 92 for SAE processed by a CVC method and SYE processed by a solgel method, respectively, are much higher than the emission intensity 94 of Er-phosphate glass under the same conditions of testing using a 980 nm pump light. Hence, one can conclude that significant improvements in fluorescence properties have been achieved by the present inventors.

To further enhance fluorescence performance, experimentation is being conducted in the following areas: (1) influence of varying $Al_2O_3/Er_2O_3$ and $Y_2O_3/Er_2O_3$ co-doping ratios on the fluorescence properties of $SiO_2$-base nanoceramics, including both metastable and stable states; (2) additions of $Yb^{3+}$ (and other additives) to increase pumping efficiency of the $Er^{3+}$ ions using 980 nm pump light; and (3) additions of Si nanoparticles to increase pumping efficiency of the $Er^{3+}$ ions at wavelengths in the visible range. The latter is expected to enable the use of available inexpensive light sources.

Figure 13:
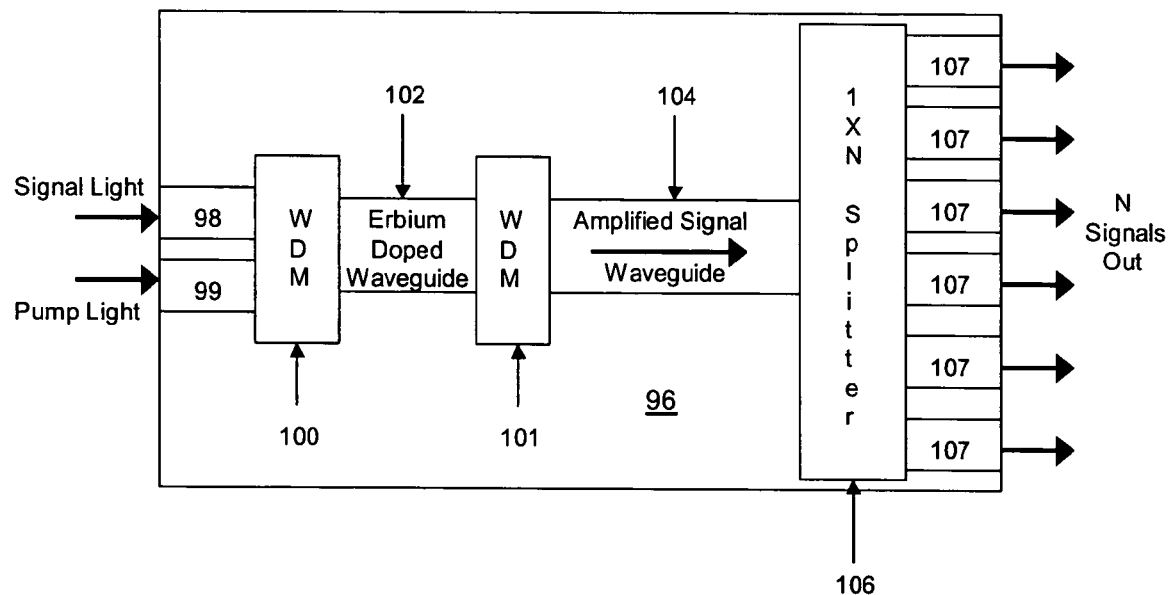
FIG. 13 shows a pictorial representation of a prototype photonic integrated circuit that includes showing an optical waveguide, wavelength division multiplexers (WDMs), an $Er^{3+}$ doped amplifier section, and a 1×N signal splitter.

FIG. 13 shows a schematic of a prototype photonic integrated circuit 96, which is currently serving as the target application for developing the new technology. A key element in the device is a high gain broadband amplifier, fabricated according to the present guidelines. The photonic integrated circuit 96 includes a first optical waveguide 98, in the form of a signal light waveguide, a second optical waveguide 99 in the form of a pump light waveguide, a first wavelength division multiplexer 100, an $Er^{3+}$-doped amplifier section 102, a second wave division multiplexer 101, an amplified signal waveguide 104, a signal splitter 106, and a plurality of output optical waveguides 107.

Figure 14:
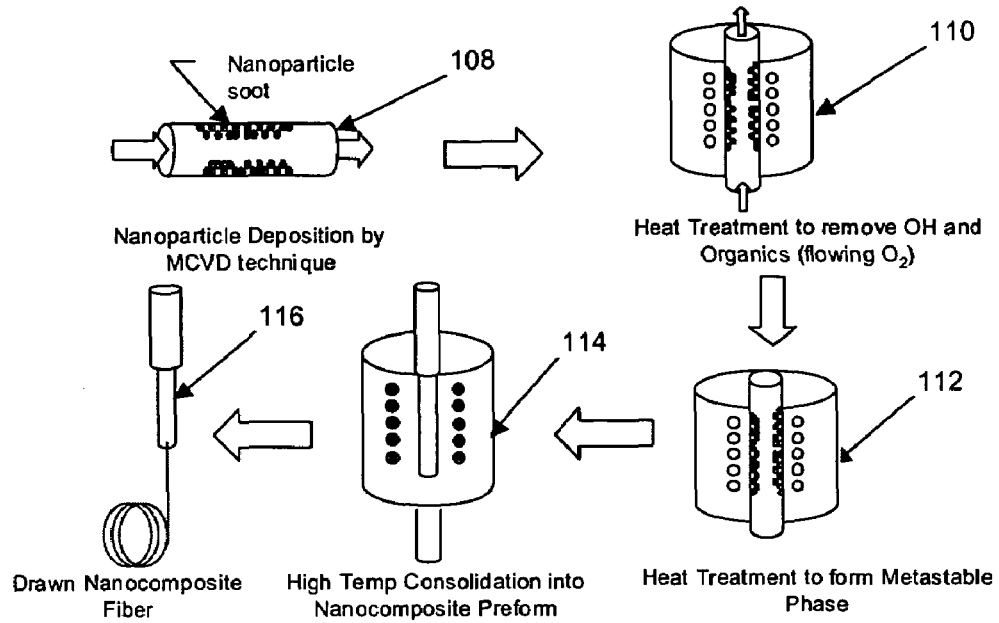
FIG. 14 shows a processing sequence for the fabrication of a nanocomposite fiber laser.
Figure 15:
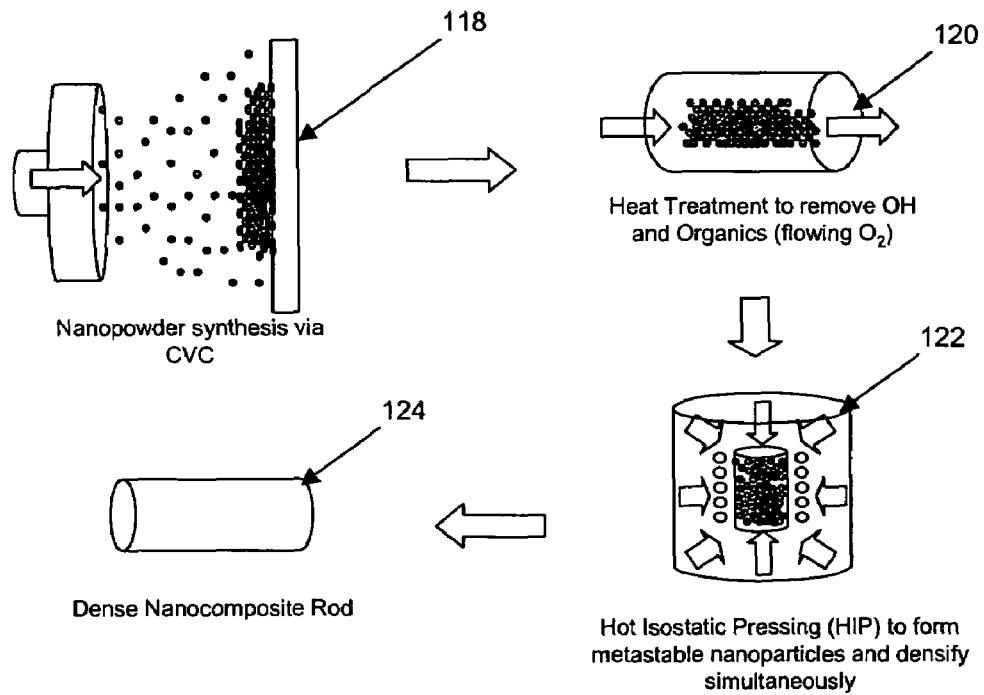
FIG. 15 shows a processing sequence for the fabrication of a nanocomposite rod laser.

An additional objective is to adapt the technology to the fabrication of preforms suitable for drawing into fibers or fabricating into rods, as depicted in FIGS. 14 and 15. It is noted in FIG. 14 that the process for fabricating a nanocomposite fiber laser includes the steps of depositing the nanocomposite material in the form of nanoparticles via a MCVD technique at step 108, heat treating the deposited nanocomposite to remove OH and organics with a flowing oxygen stream at step 110, heat treating to convert the nanocomposite material to form a metastable phase at step 112, pressure sintering under high temperature to yield a nanocomposite preform at step 114, and drawing the preform into a nanocomposite fiber at step 116. It should be noted that this represents a simple modification in today's procedure for the fabrication of fiber preforms by the conventional MCVD processing technology, so that there should be no serious obstacles to its implementation. It is noted in FIG. 15 that the process for fabricating a nanocomposite rod laser includes the step of depositing the nanocomposite material in the form of nanopowder via a CVC technique at step 118, heat treating the deposited nanocomposite to remove OH and organics with a flowing oxygen stream at step 120, pressure sintering the nanocomposite material using hot isotatic pressing (HIP) to form metastable nanoparticles and densify simultaneously at step 122, to yield a dense nanocomposite rod at step 124. Moreover, the large scale processing of rod lasers by hot pressing is straightforward and because of its low cost should be an attractive alternative to today's single crystal growth technology.

For those skilled in the art, it will be recognized that other glassy RE-doped $SiO_2$-base materials can be processed in a similar manner to achieve enhanced fluorescence emissions at different wavelengths, e.g. Pr at 1.3 μm and Tm at 1.4 μm. In addition, co-doping for energy transfer, e.g. Er/Yb, is another option.

Although various embodiments of the present invention have been shown and described, they are not meant to be limiting. Those of skill in the art may recognize certain modifications to these embodiments, which modifications are meant to be covered by the spirit and scope of the appended claims.

What we claim is:

1. A nanostructured RE-doped $SiO_2$-base material, comprising a silica matrix phase comprising a uniform nanoscale dispersion of fluorescent silicates co-doped with a rare earth and at least one of aluminum oxide and yttrium oxide.

2. The nanostructured RE-doped $SiO_2$-base material of claim 1, wherein the uniform nanoscale dispersion of fluorescent silicates comprises a high concentration of at least one of the group consisting of co-doped $Al_2O_3/Er_2O_3$, and $Y_2O_3/Er_2O_3$.

3. The nanostructured RE-doped $SiO_2$-base material of claim 2, wherein the uniform nanoscale dispersion of fluorescent silicates comprises a metastable phase (monoclinic structure), having a composition of at least one of the group consisting of $SiO_2 \cdot (Al, Er)_2O_3$, and $SiO_2 \cdot (Y, Er)_2O_3$.

4. The nanostructured RE-doped $SiO_2$-base material of claim 2, wherein the uniform nanoscale dispersion of fluorescent silicates comprises an equilibrium phase (pyrochlore structure), with a composition of at least one of the group consisting of $2SiO_2 \cdot (Al, Er)_2O_3$, and $2SiO_2 \cdot (Y, Er)_2O_3$.

5. The nanostructured RE-doped $SiO_2$-base material of claim 3, wherein the $Al_2O_3$:$Er_2O_3$ or $Y_2O_3$:$Er_2O_3$ ratio in the metastable phase is greater than 1:1 to mitigate concentration quenching.

6. The nanostructured RE-doped $SiO_2$-base material of claim 4, wherein the $Al_2O_3$:$Er_2O_3$ or $Y_2O_3$:$Er_2O_3$ ratio in the equilibrium phase is greater than 1:1 to mitigate concentration quenching.

7. A method for making a nanostructured RE-doped $SiO_2$-base material comprising the steps of:
  producing a silica rich starting material in the form of nanosized particles comprising a rare earth and at least one of aluminum oxide and yttrium oxide;
  condensing the nanosized particles into a bulk body; and
  heat treating the bulk body at a temperature of from about 1000° C. to 1400° C. for up to 24 hours to form a silica matrix phase comprising a uniform nanoscale dispersion of fluorescent silicates co-doped with said rare earth and said at least one of aluminum oxide or yttrium oxide.

8. The method of claim 7, wherein said heat treating step further includes the step of:
  heat treating the bulk body at a temperature in the range of from about 1000° C. to 1200° C., for to yield a uniform nanoscale dispersion of said co-doped fluorescent silicates in a metastable phase within said silica matrix phase.

9. The method of claim 7, wherein said forming step includes the step of:
  heat treating the bulk body at a temperature of about 1400° C. and for to yield a uniform nanoscale dispersion of said co-doped fluorescent silicates in an equilibrium phase within said silica matrix phase.

10. The method of claim 8, wherein
  said silica rich starting material comprises a high concentration of at least one of the compositions selected from the group consisting of co-doped $Al_2O_3/Er_2O_3$ and $Y_2O_3/Er_2O_3$ in a supersaturated solid solution.

11. The method of claim 9, wherein
  said silica rich starting material comprises a high concentration of at least one of the compositions selected from the group consisting of co-doped $Al_2O_3/Er_2O_3$ and $Y_2O_3/Er_2O_3$ in a supersaturated solid solution.

12. The method of claim 8, wherein said uniform nanoscale dispersion of said co-doped fluorescent silicates has a grain size <100 nm, thus retaining high optical transparency.

13. The method of claim 12, wherein said grain size ranges from 1 to 20 nm.

14. The method of claim 9, wherein said uniform nanoscale dispersion of said co-doped fluorescent silicates has a grain size <100 nm.

15. The method of claim 14, wherein said grain size ranges from 1 to 10 nm.

16. The method of claim 10, wherein the yielded uniform nanoscale dispersion of said co-doped fluorescent silicates within said silica matrix phase has a high gain fluorescence emission, with a broad and flat peak centered at about 1.55 µm.

17. The method of claim 11, wherein the yielded uniform nanoscale dispersion of said co-doped fluorescent silicates within said silica matrix phase has a high gain fluorescence emission, with several prominent peaks centered at about 1.55 µm.

18. The method of claim 8, wherein said
  silica rich starting material comprises a high concentration of at least one of the compositions selected from the group consisting of co-doped $Al_2O_3$/RE and $Y_2O_3$/RE oxides, where RE includes Pr, Tb, Eu, and Tm.

19. The method of claim 10, further including the step of:
  introducing into said silica rich starting material one or a combination of oxide phases selected from the group consisting of network formers, modifiers, and intermediates.

20. The method of claim 18, further including the step of:
  introducing into said silica rich starting material one or a combination of oxide phases selected from the group consisting of network formers, modifiers, and intermediates.

21. The method of claim 7, further including the step of:
  synthesizing said silica rich starting material using a process selected from the group consisting of vapor-phase, solgel, spray-pyrolysis, and rapid solidification.

* * * * *